United States Patent
Cooper et al.

(10) Patent No.: US 6,578,605 B2
(45) Date of Patent: Jun. 17, 2003

(54) MODULAR VACUUM AND LOW PRESSURE VALVE ASSEMBLY

(75) Inventors: Robert L. Cooper, LaPorte, IN (US); Robert G. Schultz, New Buffalo, MI (US)

(73) Assignee: Dekker Vacuum Technologies, Inc., Michigan City, IN (US)

( * ) Notice: Subject to any disclaimer, the term of this patent is extended or adjusted under 35 U.S.C. 154(b) by 0 days.

(21) Appl. No.: 09/893,232

(22) Filed: Jun. 27, 2001

(65) Prior Publication Data

US 2003/0000585 A1 Jan. 2, 2003

(51) Int. Cl.[7] ............................................. F16K 11/048
(52) U.S. Cl. ...................... 137/625.5; 251/366; 137/271
(58) Field of Search ............................... 137/625.5, 271; 251/366

(56) References Cited

U.S. PATENT DOCUMENTS

| | | | |
|---|---|---|---|
| 3,860,033 A | * 1/1975 | Grove et al. | 137/625.5 |
| 3,988,787 A | * 11/1976 | Colee | 4/489 |
| 4,311,164 A | 1/1982 | Welch | |
| 5,152,320 A | * 10/1992 | Zimmerly | 137/625.5 |
| 5,404,905 A | * 4/1995 | Lauria | 137/557 |
| 5,490,745 A | 2/1996 | Thiele et al. | |
| 6,105,615 A | * 8/2000 | Goldsmith | 137/625.5 |

* cited by examiner

*Primary Examiner*—John Fox
(74) *Attorney, Agent, or Firm*—R. Tracy Crump

(57) ABSTRACT

A modular valve assembly of this invention includes individual valve units and components, which can be selectively combined to form an integrated multi-port, multi-way valve assembly that is operated by a single common linear actuator is disclosed. The modular design of this invention is facilitated by the construction of valve housings and valve components of the individual valve units and assemblies of common plumbing pipes and fittings, such as, tee joints, threaded couplings, bushings and reducers. A single linear actuator, such as a conventional solenoid or piston cylinder mounted to the end of the valve housing, reciprocates an elongated shaft running axially through the valve interior to move various valve discs into and out of engagement with various internal valve seats, thereby controlling the valve assembly operation.

17 Claims, 11 Drawing Sheets

MODULAR VACUUM AND LOW PRESSURE VALVE ASSEMBLY

This invention relates to control valves, and in particular, modular control valve assemblies for vacuum and low pressure pneumatic applications.

BACKGROUND OF THE INVENTION

Control valves for vacuum and low pressure applications are well known in the field of pneumatics control systems. Many types and varieties of control valves have been developed to accommodate the wide range of application requirements. Some control valves are designed to be normally open or normally closed. Other valves have multiple inlet and outlet ports and others provide three and four way valving from a single valve. Typically, control valves are actuated by their own internal control mechanisms and are operatively connected to an electrical or pneumatic line, which controls the operation of the valves.

Conventional control valves have several design limitations and cost restrictions, particularly in low pressure and vacuum applications. The valve housings are constructed of cast metals, such as brass and aluminum which makes the valves heavy and expensive. In low pressure pneumatic applications, constructing valve housings of brass and aluminum is often unnecessary for fluid control or safety purposes and simply adds cost to the system. A simple plastic valve housing often would provide sufficient structural integrity to the valve. In addition, valve housings must also be cast or machined to enclose the internal valving components and intricate flow passages. Valves traditionally have complex internal actuation components, including springs, poppets, seals, and diaphragms incorporated into sophisticated metal valve housings. The internal passages and components are even more intricate in multi-port multi-way valves. These intricate internal components are often subject to wear and contamination failure, which require maintenance in order to ensure the longevity of the valve and pneumatic system. The integration of the actuation mechanism into the valve housing often makes it more cost effective to replace the valve than to repair it.

Conventional control valves are not designed or well suited for integration into a wide range of pneumatic applications. Since plastic piping is cost effective for most pneumatic applications, conventional control valves must be connected to plastic pipe systems. Integrating conventional cast metal control valves into plastic piping systems is difficult and adds considerable fittings, supports, weight and cost to pneumatic applications. Because of the cost of cast or machined metal housings, the range of sizes of conventional control valves is often limited. The use of small control valves in many pneumatic applications creates flow restriction problems. Conventional control valves often require expensive filtration systems to reduce obstructed flow passages and prolong the life of the valves. Conventional control valves are also limited in the range of pipe fitting sizes. As a result, bushings and reducers must used to mate the control valves to larger piping systems, which adds to application costs. Furthermore, conventional control valves are also ill suited because of the type of application in which they are incorporated. For example, many pneumatic applications require the control of alternating positive and negative (vacuum) air pressures. In such applications, conventional valve designs are not well suited for dual purpose use with positive and negative pressure.

Heretofore, control valves have not been developed that employ modular design systems, so that individual valve units and valving components can be selectively combined into a complex valve assembly that allows the individual valve unit to operate from a common actuation component. While individual valves can be employed in series and parallel connected by pipe sections, to create an infinite array of pneumatic systems, each valve must be individually controlled. Electrical or pneumatic control lines must be routed to each control valve in the system, which complicates the system. Multi-port, multi-way valves (3-way valves, 4-way valves, etc. . . . ) provide greater design flexibility, but are generally more expensive and costly to maintain. A modular valve system would allow low cost individual valve units and components to be conveniently interconnected into more complex valve assemblies for integration into any particular design application. A modular valve system would also reduce the number of control lines needed to control the valve assembly in a given application thereby reducing costs.

SUMMARY OF THE INVENTION

The modular valve assembly of this invention addresses many of the traditional shortcomings of conventional control valves, particularly in vacuum and low pressure pneumatic applications. The modular valve assembly of this invention includes individual valve units and components, which can be selectively combined to form an integrated multi-port, multi-way valve assembly that is operated by a single common linear actuator. The modular design of this invention is facilitated by the construction of valve housings and valve components of the individual valve units and assemblies constructed of common plumbing pipes and fittings, such as, tee joints, threaded couplings, bushings and reducers. Common tee joints provide the basic configuration of the individual valve units. A linear actuator, such as a conventional solenoid or piston cylinder mounted to the end of the valve housing, reciprocates an elongated shaft running axially through the valve interior to move a valve disc into and out of engagement with an internal valve seat. Because the valve housings and components are constructed from common plumbing pipes and fittings, individual valve units can be connected end to end along with other valve components to form an integrated multi-port, multi-way valve assembly. The multi-way valving for such valve assembly is accomplished connecting multiple valve discs to a common valve shaft reciprocated by a single actuator to seal against multiple internal valve seats.

Accordingly, an advantage of the modular valve assembly of this invention over conventional control valves is that it allows individual valve units and components to be selectively combined and integrated into larger more complex valve assembles as required for any particular application.

Another advantage of the modular design of this valve assembly is that it allows individual valve units and components to be readily serviced and replaced with minimum labor, effort and disruption to the valve system in which it is incorporated.

Another advantage is the construction of the valve assembly from common PVC plumbing pipes and fittings, which reduces the cost, weight and complexity of the individual valve units, valve components and integrated valve assemblies.

Another advantage of this valve assembly is that use of common plumbing joints and fittings as valve housings allows the valves to be readily connected to both pipe and hose lines of vacuum and pneumatic systems.

Another advantage of this valve assembly is that it can tolerate extreme environments and be used with air flows containing high particulate counts, because the valve housings provide large open flow passages.

Another advantage is that this modular valve assembly can be scaled up and down to accommodate any application consideration.

Another advantage is that the design of this modular valve assembly reduces the cost of producing valve assembles for a wide range of pneumatic applications by eliminating the expense of tooling, castings and machining valve assembles in various configurations and scales.

Another advantage is that the design of this valve assembly provides for adjustable port orientations both radially and axially.

Other advantages will become apparent upon a reading of the following description.

BRIEF DESCRIPTION OF THE DRAWINGS

A preferred embodiment of the invention has been depicted for illustrative purposes only wherein.

DESCRIPTION OF THE PREFERRED EMBODIMENT

The preferred embodiment herein described is not intended to be exhaustive or to limit the invention to the precise form disclosed. It is chosen and described to best explain the invention so that others skilled in the art might utilize its teachings.

The modular valve assembly of this invention includes individual valve modules or units and valve components, all of which can be combined and interconnected to form various integrated valve assemblies for use in low pressure vacuum and pneumatic applications. The valve assembly is designed and intended for low pressure pneumatic applications, but can be modified for high pressure or hydraulic applications. The valve assembly can be used equally with positive or negative (vacuum) air pressures. The figures illustrate the individual valve units and valve components as separate valves, component parts, and as integrated components of large valve assemblies. The different embodiments of the individual valve units, component parts, and valve assemblies are not intended to be exhaustive, but to illustrate the advantages, convenience and utility of this invention. The scope of this invention is not limited to the embodiments shown and described herein.

As shown, most of the components (valve housings and seat assemblies) forming the individual valve units and the valve assemblies are constructed of common pipes and plumbing fittings. Ideally, the plumbing pipes and fittings are constructed of polyvinylchloride (PVC), chlorinated polyvinylchloride (CPVC) or other common plastics, but can also be constructed of suitable metals. PVC and CPVC pipes and plumbing fittings are well known in the plumbing industry. PVC and CPVC pipes and fittings are readily available and can be obtained commercially from various manufactures and suppliers. Valve housings and valve seats for the individual valve units are assembled by interconnecting various pipes, tee joints, couplings, bushings, collars, reducers and elbows. The pipes and fittings are held together by bonding conventional PVC and PVC compounds, which also provides an air tight seal between the pipes and fittings. The various embodiments of the valve units and valve assemblies described herein are assembled using various combinations of pipes and fittings. The use of common PVC and CPVC pipes and fittings allows the valve units to be scaled in size by the use of different sized pipes and fittings.

Individual Valve Units

Figure 1:
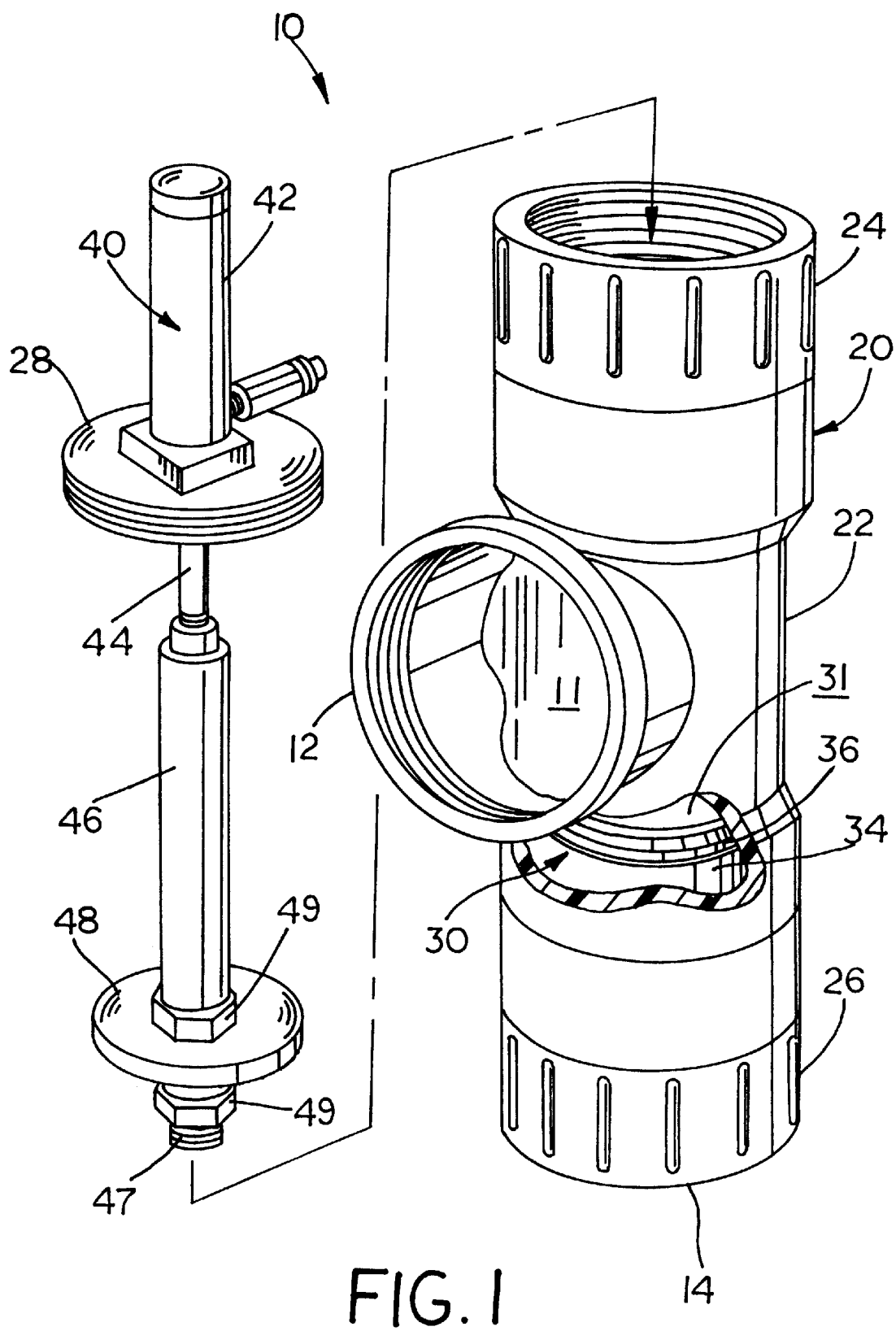
FIG. 1 is an exploded perspective view of a first embodiment of an individual valve unit of this invention.
Figure 2:
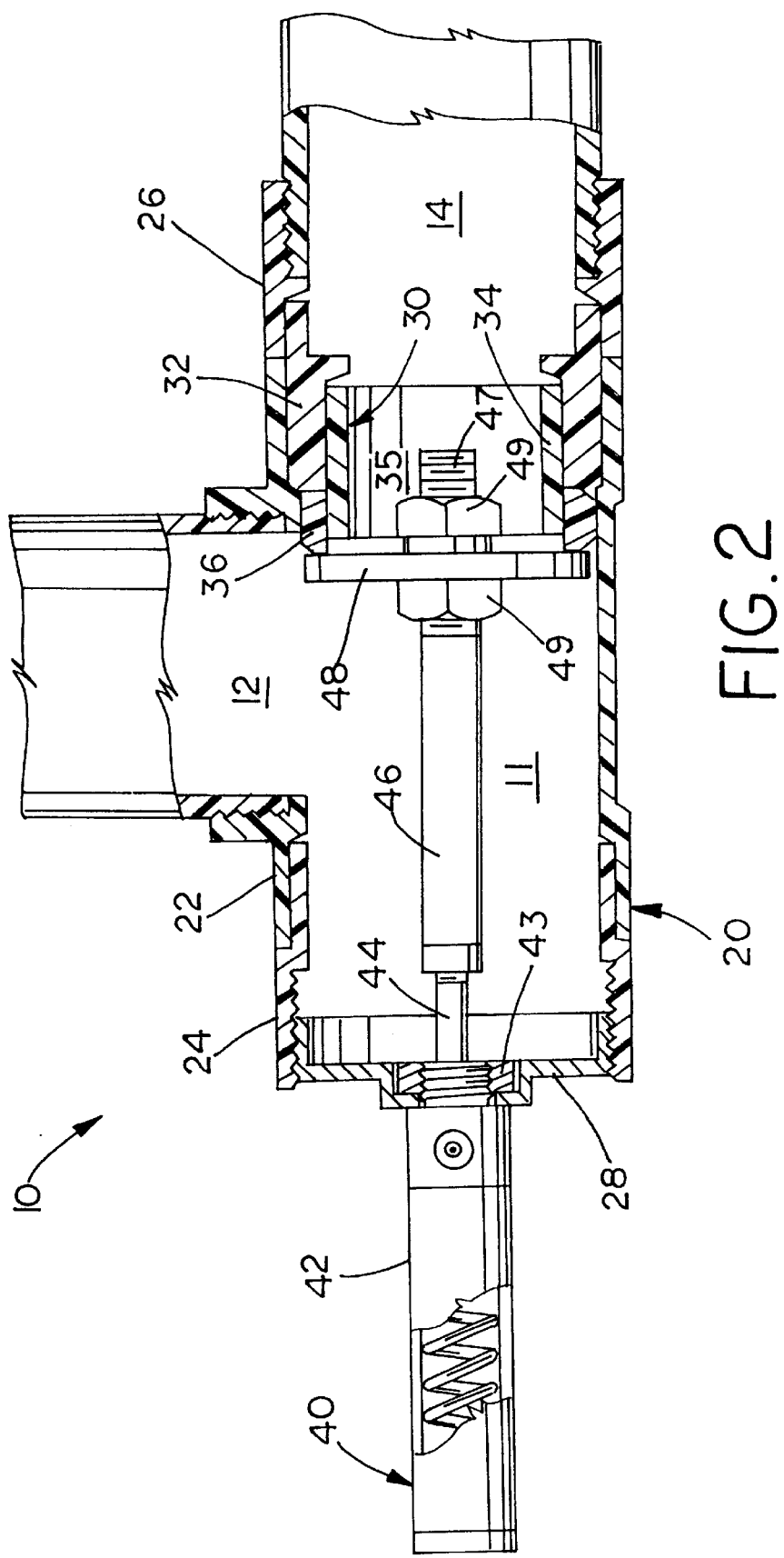
FIG. 2 is a side sectional view of the valve unit of FIG. 1 shown in a closed position.
Figure 3:
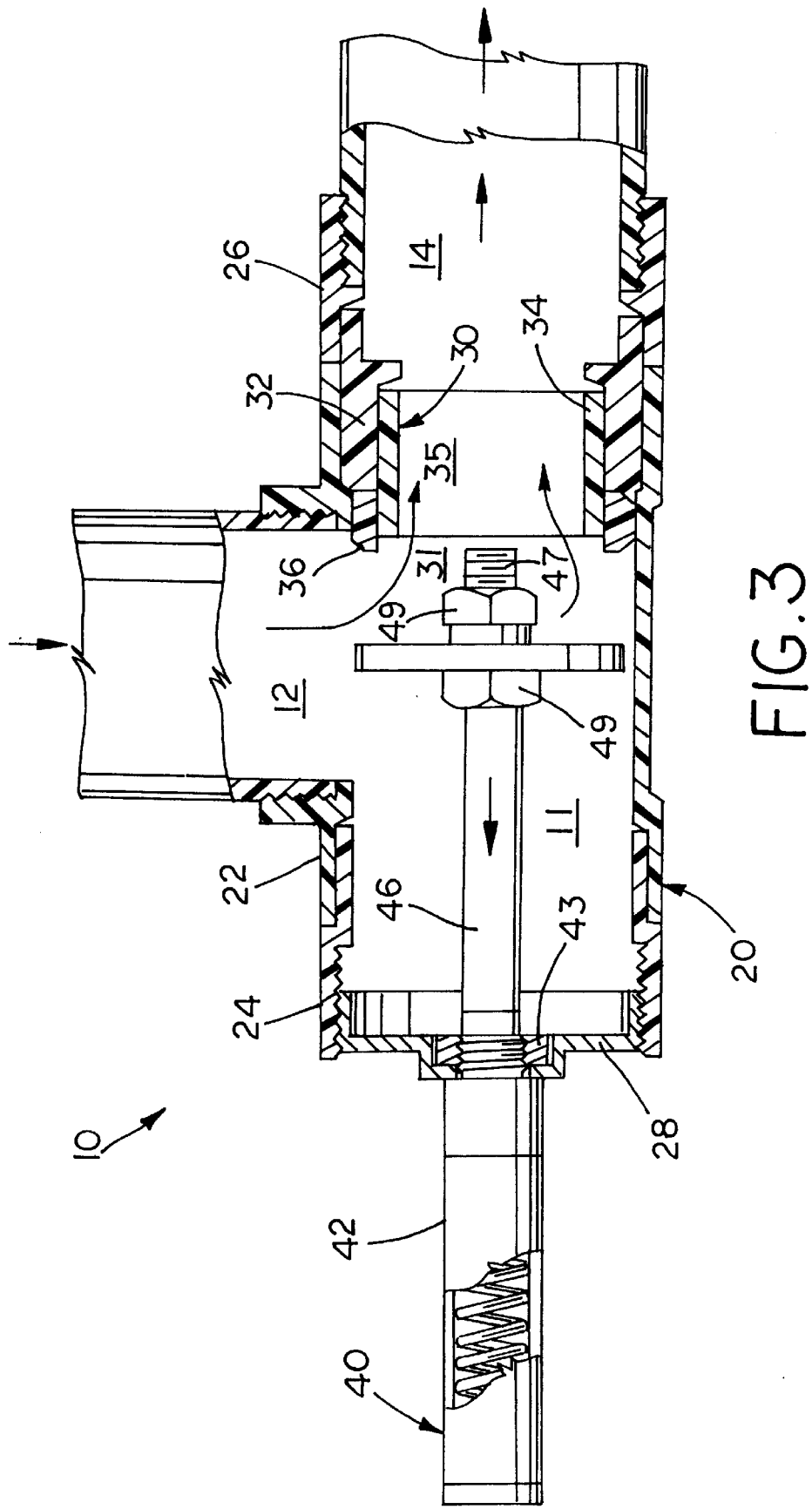
FIG. 3 is a side sectional view of the valve unit of FIG. 1 shown in an open position.

FIGS. 1–3 illustrate the first embodiment of a single valve module or unit, designated by reference numeral 10. Valve unit 10 is illustrated in FIGS. 1–3 as a stand alone valve in a normally open configuration. Valve 10 can be readily modified for a normal closed configuration or for incorporation into an integrated valve assembly. FIGS. 1–3 are intended simply to illustrate the basic construction, assembly and operation of the valve unit as a stand alone valve.

Valve unit 10 has a side port 12 and an end port 14, either of which can act as an inlet or outlet as required. As shown in FIGS. 1–3, valve unit 10 includes a valve housing 20, a fixed seat assembly 30, a valve disc or gate 38, and a linear actuator 40. Valve housing 20 is constructed of a tee joint 22, two end couplings 24 and 26, and an end cap 28. Tee joint 22 is the principal body component of valve housing 20 and generally defines the cylindrical valve interior 11 of the valve unit. As shown in FIGS. 2 and 3, end coupling 24 is fitted into one end of tee joint 22 and end coupling 26 is fitted to the other end of tee joint 22 by a bushing 32. Bushing 32 also forms part of seat assembly 30. End cap 28 is turned into the threaded throat of male coupling 24 to enclose one end of valve housing 20. While tee joint 22, couplings 24, 26 and bushing 32 are constructed of PVC or CPVC, end cap 28 is constructed of a metal, such as brass or aluminum, or other material suitable for supporting actuator 40 and enclosing one end of the valve housing.

As shown, valve seat assembly 30 includes bushing 32, pipe section 34 and an annular seal 36. Bushing 32 connects coupling 26 and tee joint 22, and provides the internal support for the valve seat 31. Pipe section 34 is seated within bushing 32 and extends into valve interior 11. Seal 36 is a rubber O-ring or gasket bonded to the end pipe section 34, which forms valve seat 31 within valve interior 11. Pipe section 34 provides an open flow conduit 35 between valve seat 31 and port 14.

Actuator 40 is s a conventional spring return pneumatic piston cylinder mounted to the exterior of valve housing 20. While actuator 40 is illustrated as a piston cylinder, any suitable linearly reciprocating mechanism may be employed, such as a solenoid or other types of piston cylinders. Actuator 40 is operated by a pneumatic control line (not shown). As shown, actuator 40 includes a cylinder body 42 and an extensible piston shaft 44. Cylinder body 42 is mounted to end cap 28 so that piston shaft 44 extends into the valve interior 11 and reciprocates along the longitudinal axis of the interior. Cylinder body 42 is secured to the outside of end cap 28 by a hex nut 43. An elongated shaft extension 46 is threaded onto the distal end of piston shaft 44. A flat valve disc or gate 48 is adjustably connected to the threaded distal end 47 of shaft extension 46 by two hex nuts 49, or other suitable fasteners. Preferably, valve disc 48 is constructed of a suitable material, such as, steel, brass, aluminum or plastic. Threaded end 47 of shaft extension 46 extends through a central bore in valve disc 48, which allows hex nuts 49 to be turned to secure the disc in different positions along the length of the threaded end of the shaft extension. FIG. 2 shows valve unit 10 in the closed position. In the closed position (actuator 40 is activated), piston shaft 44 is extending into valve interior 11 and valve disc 48 is pressed against valve seat 31, thereby preventing flow between side port 12 and end port 14 through valve interior 11 and passage 35. FIG. 3 shows valve unit 10 in the normally open position. In the open position (actuator 40 is deactivated), piston shaft 44 is retracted into cylinder body 42 and valve disc 48 is spaced from valve seat 31, thereby permitting air flow between side port 12 and end port 14.

Figure 4:
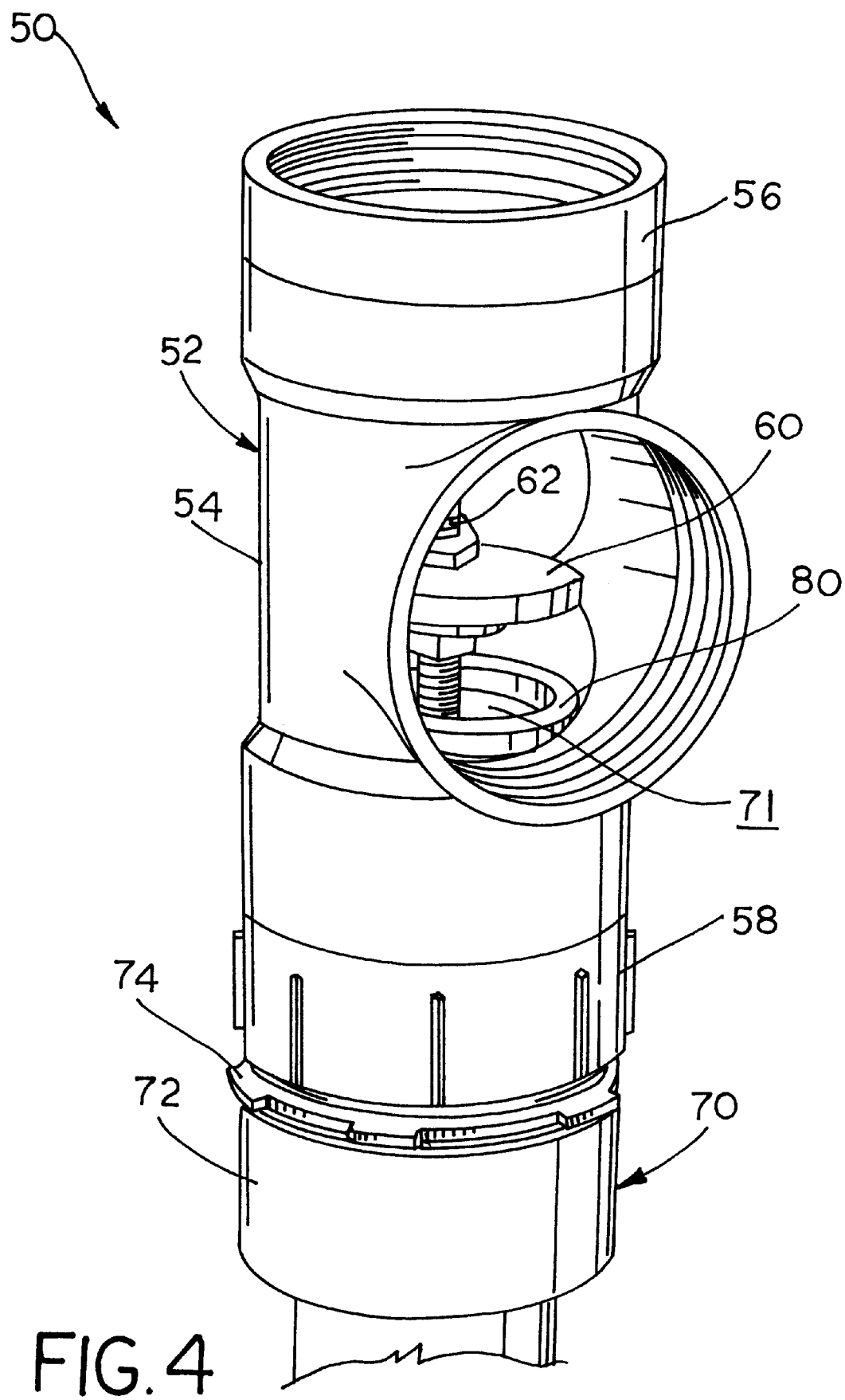
FIG. 4 is a perspective view of a second embodiment of an individual valve unit.
Figure 5:
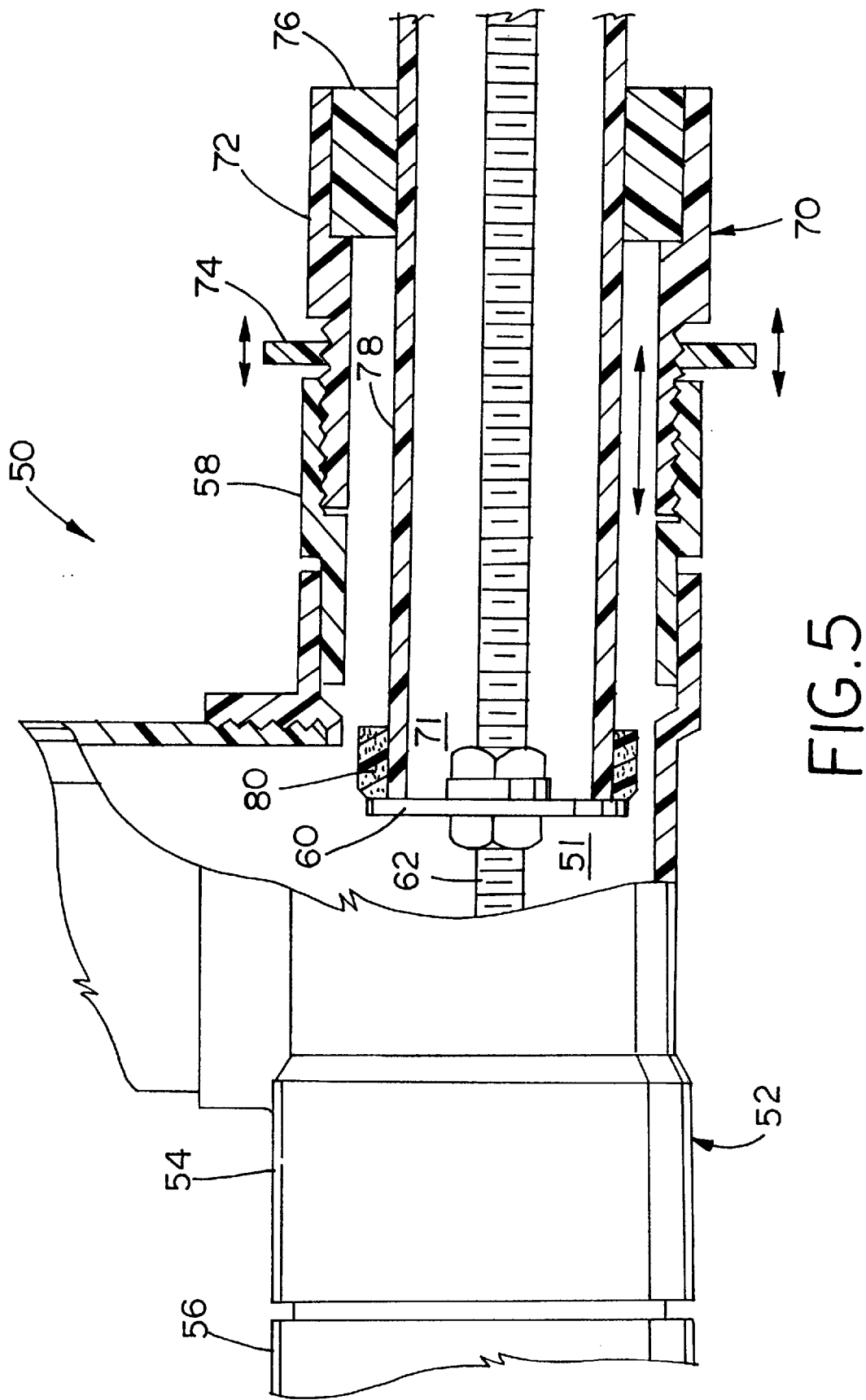
FIG. 5 is a side view of the valve unit of FIG. 4 with a partial sectional view of the adjustable valve seat assembly, which shows the valve seat extending into the center of the valve interior.
Figure 6:
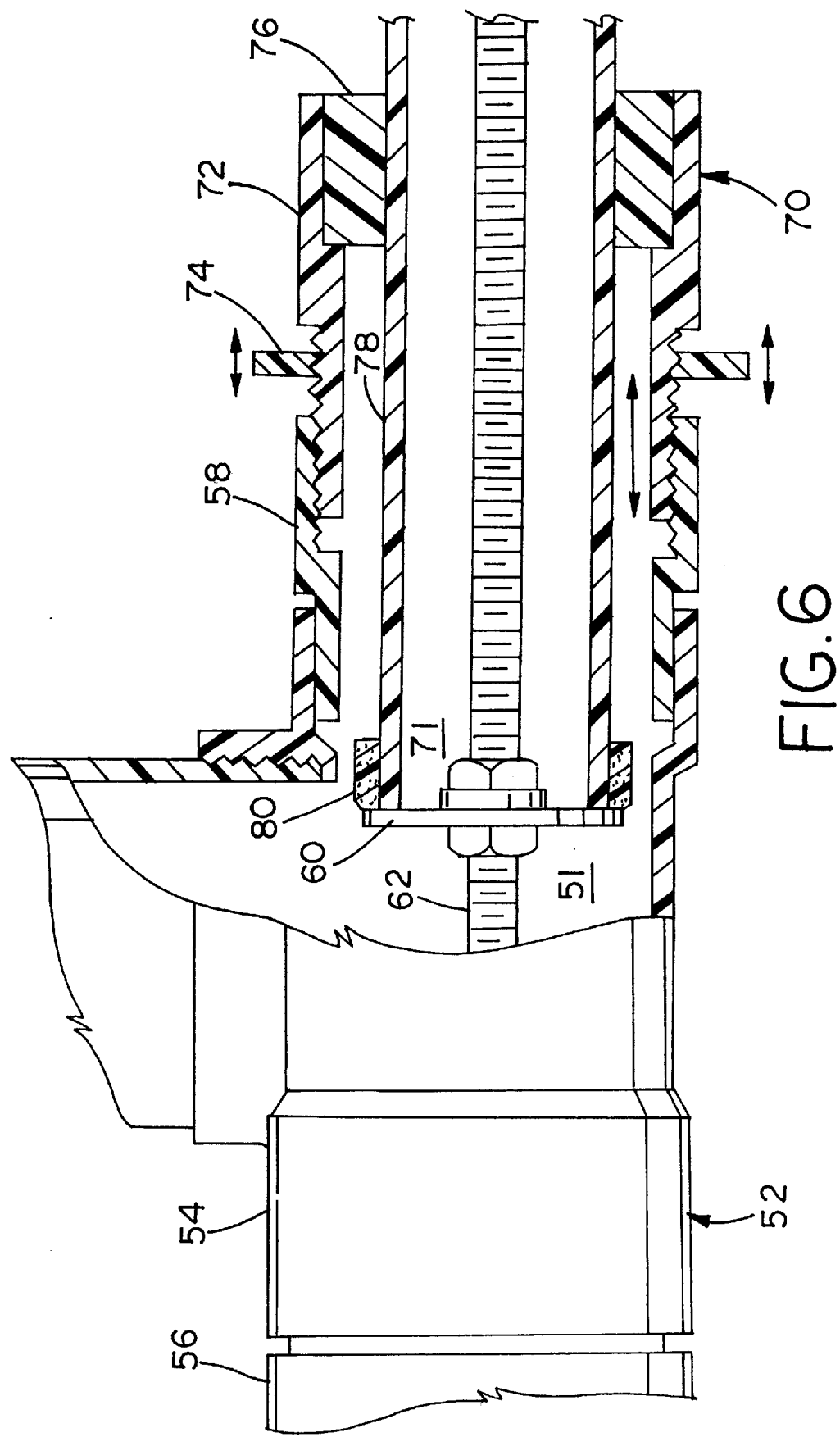
FIG. 6 is a side view of the valve unit of FIG. 4 with a partial sectional view of the adjustable valve seat assembly, which shows the valve seat position back off from the center of the valve interior.

FIGS. 4–6 show a second embodiment of the valve unit, designated as reference number 50. Valve unit 50 has an adjustable seat assembly 70, which allows the position of the valve seat to be adjusted within the valve interior. Valve unit 50 is illustrated as a component part to be integrated into a larger valve assembly of the type described hereafter. As shown in FIGS. 4–6, valve unit 50 has an open valve interior, which allows it to be readily connected to other valve units (not shown). It should be noted that valve unit 50 could be modified to function as a stand alone valve in the same manner as valve unit 10 described above. FIGS. 4–6 are intended simply to further illustrate the basic construction, assembly and operation of this valve unit, as a component part of a larger valve assembly, and particularly, the construction and operation of the adjustable valve seat assembly.

Valve unit 50 follows the same basic construction as valve unit 10 of the first embodiment. As shown in the figures, valve unit 50 includes a valve housing 52, a valve disc or gate 60, a threaded shaft 62, and an adjustable valve seat assembly 70. Again, valve housing 52 includes a tee joint 54 and two end couplings 56, 58 fitted into the ends of the tee joint. Adjustable seat assembly 70 includes an adjustment coupling 72, lock ring 74, a reducer bushing 76, a pipe section 78 and an annular seal 80. Adjustment coupling 72 has a threaded neck, which is turned into the threaded throat of end coupling 58. Reducer bushing 76 is fitted into the distal end of adjustment coupling 72. Pipe section 78 is seated within bushing 76 and extends into valve interior 51. Against, seal 80 is a rubber O-ring or gasket bonded to the end pipe section 78, which forms valve seat 71 within valve interior 51. As illustrated in FIGS. 5 and 6, the position of valve seat 71 can be shifted longitudinally within valve interior 51, by turning adjustment coupling 72 into end coupling 58. Once the desired position is obtained, lock ring 74 can be turned down against end coupling 58 to secure valve seat 71 in position.

Integrated Valve Assemblies

FIGS. 7–10 illustrate two different embodiments of typical integrated valve assemblies created by connecting and integrating various individual valve units and valve components. The two embodiments are not intended to limit the scope of this invention, but simply to illustrate how the individual valve units and components can be interconnected and arranged into an integrated valve assembly.

Figure 7:
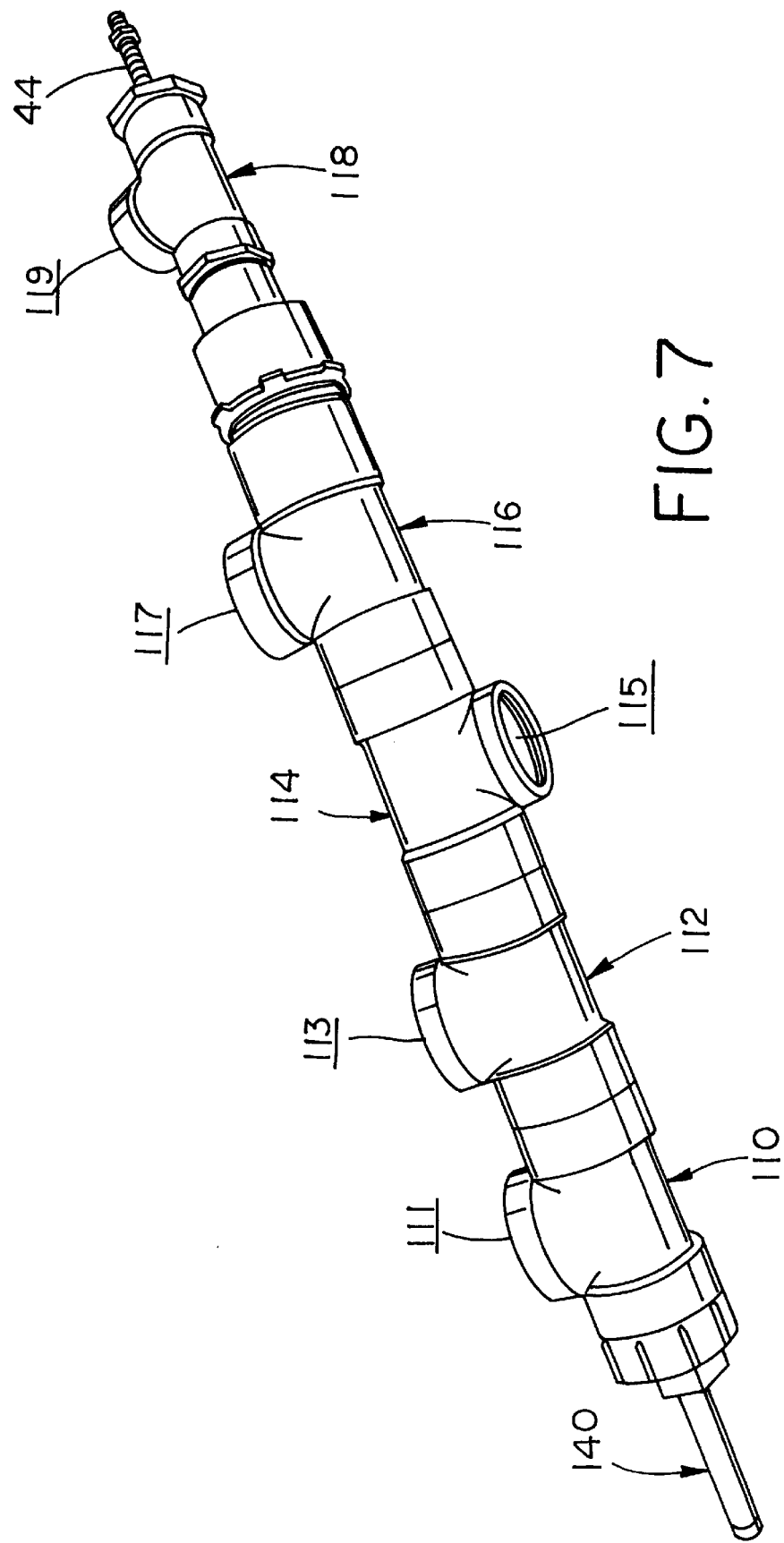
FIG. 7 is a perspective view of a five-way valve assembly.
Figure 8:
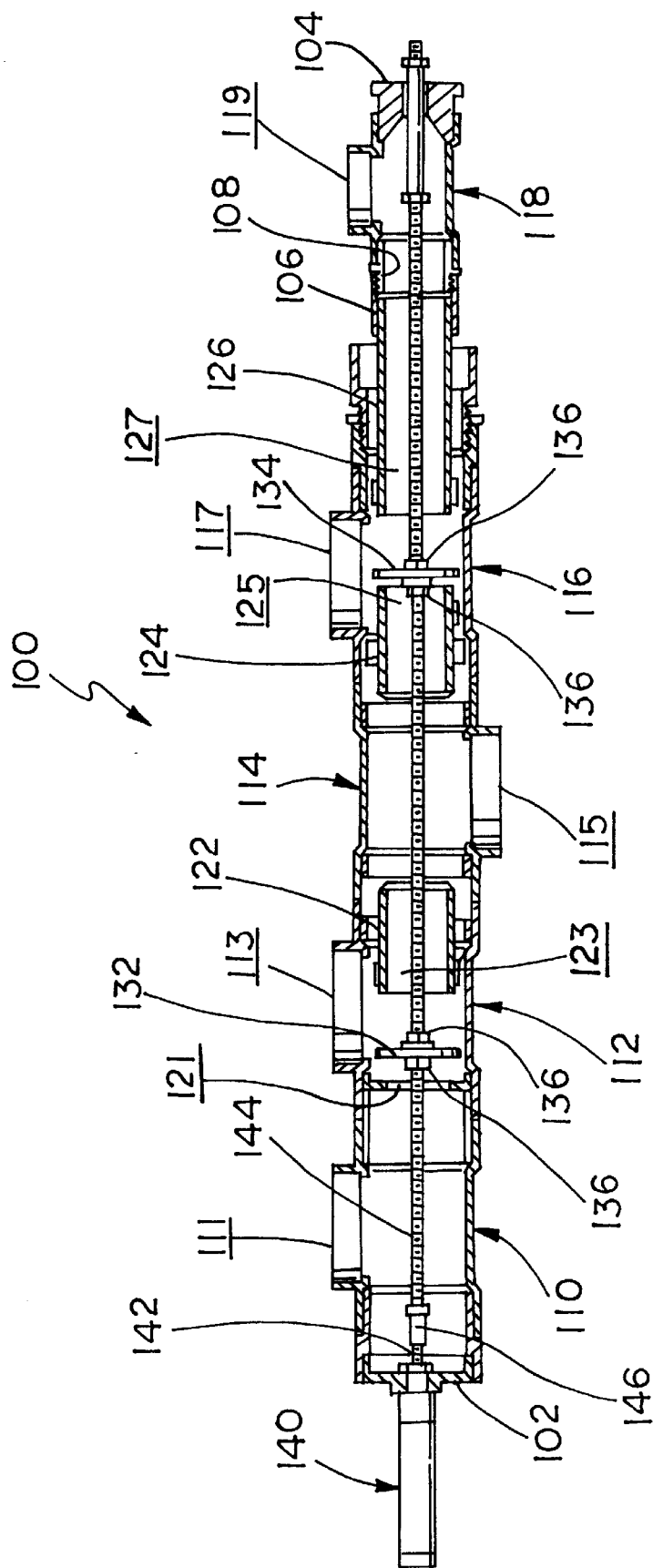
FIG. 8 is a side sectional view of the five-way valve assembly of FIG. 7.
Figure 9:
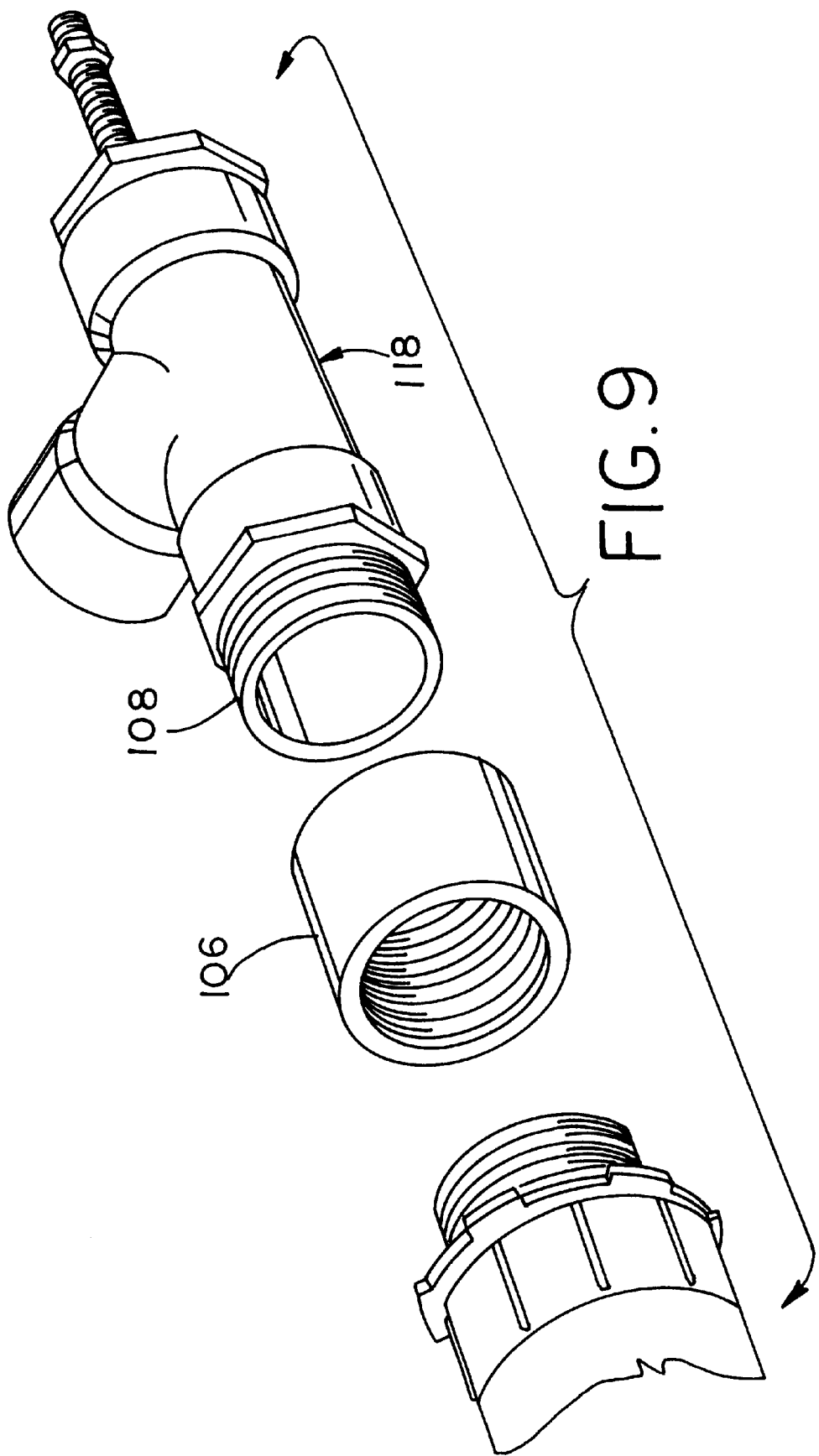
FIG. 9 is a partial exploded perspective view of the end valve units and couplings of the five-way valve assembly of FIG. 7.

FIGS. 7–9 show a first embodiment of an integrated valve assembly as a five-port five-way valve assembly, designated as reference numeral 100. Valve assembly 100 is formed by five individual valve units 110, 112, 114, 116, and 118. The individual valve units are interconnected by various fittings, such as, pipe sections, reducers, bushings and threaded couplings. The interconnection of the individual valve units is readily understandable to one of ordinary skill in the art, and will not be described in detail herein, except to provide additional insight into the utility of this invention. The valve housings of valve units 110, 112, 114, 116, 118 are joined end to end, which creates an integrated valve interior 101 running the length of the valve assembly. Valve assembly 100 includes five ports, 111, 113, 115, 117, 119, one for each individual valve unit. The valve units 110, 112, 114 and 116 are interconnected together so that their side ports are fixed in any radial orientation to each other. As shown, ports 110, 112 and 116 are 180 degrees opposed to port 114. The radial orientation of the ports may vary as desired for connection into the particular vacuum or pneumatic system, without deviating for the teachings of this invention. As shown in FIG. 9, valve unit 116 and valve unit 118 are interconnected by a threaded coupling 106 and bushing 108, which allows the radial orientation of port 119 to be readily adjusted with respect to the other ports. The interconnection can also provide a limited range of axial adjustment of the side ports.

As shown in FIGS. 7 and 8, valve assembly 100 includes four internal valve seats 121, 123, 125, 127, and two valve discs or gates 132, 134 which provide its five way valving. Valve seat 121 is formed by a reducing bushing 120 fitted into one end of individual valve unit 112. Valve seat 123 is formed by a fixed seat assembly 122 fitted into the opposite end of individual valve unit 112. Valve seat 125 is formed by a second fixed seat assembly 124 fitted into one end of individual valve unit 116. Both fixed valve seat assemblies 123, 125 are of the type employed in valve unit 10, which was described supra. Valve seat D127 is formed by an adjustable valve seat assembly 126 fitted into the opposite end of individual valve unit 116. Adjustable valve seat assembly 126 is of the type employed in valve unit 50, which was described supra.

The five way valving of valve assembly 100 is operated by a single actuator 140 mounted to the end cap 102 fitted into individual valve unit 110. A long threaded shaft 144 is connected to the reciprocal piston shaft 142 of actuator 140 by a shaft coupling 146. Shaft 144 extends through the valve assembly interior along the longitudinal axis running the entire length of the valve assembly. The terminal end of shaft extension 134 extends through another end cap 104 fitted into valve unit 118. Valve discs 132 and 134 are adjustably mounted to shaft 144 by two sets of hex nuts 136 or other suitable fasteners. Valve disc 132 is connected to shaft 144 to be positioned between valve seat 121 and valve seat 123. Valve disc 134 is adjustably mounted to shaft 144 to be positioned between valve seat 125 and valve seat 127. The location of the valve discs along the length of the shaft with respect to the valve seats can be finely adjusted by hex nuts 136 or other suitable fasteners or clamping devices. In addition, the adjustable valve seat assembly can be used to vary the longitudinal location of valve seat 125 within the valve assembly interior as desired.

Figure 10:
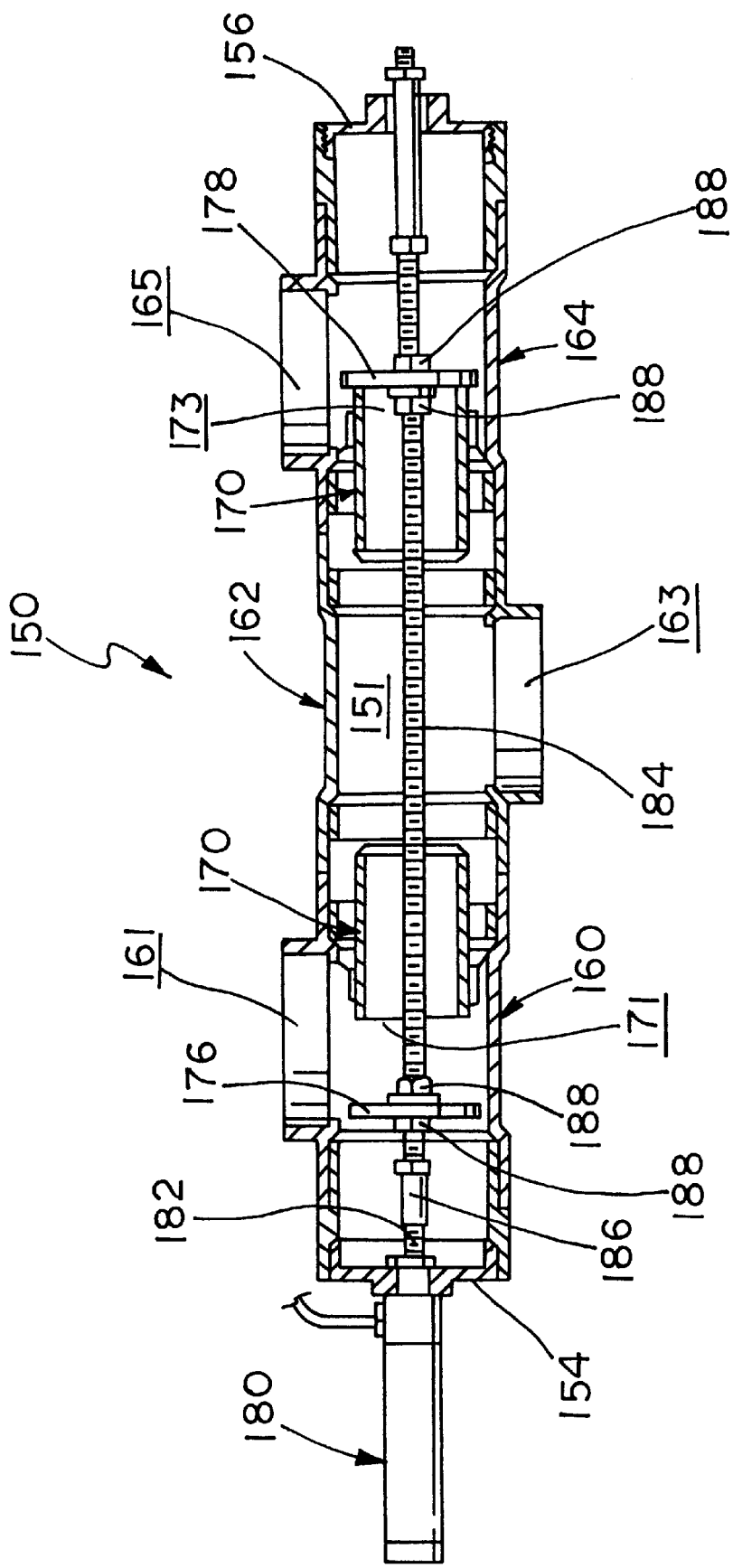
FIG. 10 is a side sectional view of a three-way valve.

The five way valving operation of valve assembly 100 is similar to the operation of a single valve unit. Actuator 140 linearly moves the valve discs within the valve assembly interior to abut against one the valve seats to seal off various ports from one another. As shown in FIG. 10, when actuator 140 is deactivated, shaft 144 moves valve disc 132 against valve seal 121 and valve disc 134 against valve seal 125, thereby permitting air flow between ports 113 and 115, and ports 117 and 119, respectively. When actuator 140 is activated, shaft 144 moves valve disc 132 against valve seal 123 and valve disc 134 against valve seal 127, thereby permitting air flow between ports 111 and 113, and ports 115 and 117, respectively.

FIG. 10 illustrates a second valve assembly embodiment as a three-way valve assembly, designated by reference numeral 150. Valve assembly 150 is constructed of three individual valve units 160, 162, and 164 interconnected by different fittings, which are pipe sections, reducers, bushings, and threaded couplings. Again, the interconnection of the valve housings of each valve unit is readily understandable to one of ordinary skill in the art, and will not be described in detail herein, except to provide additional insight into the utility of this invention. The valve housings of each valve unit 160, 162, and 164 are joined end to end, which creates an integrated valve interior 151 running the length of the valve assembly. Valve assembly 150 includes three ports, 161, 163, 165, that is one port for each individual valve unit. As shown, the valve units are interconnected together so that the side ports are fixed in any radial orientation to each other; however, the valve units may be interconnected using the fittings of the type shown in FIG. 8 so that the radial and axial orientation of the ports may be readily adjusted within the scope of this invention.

Valve assembly 150 includes two internal valve seats 171 and 173 and two valve discs or gates 176, 178 which provide its three-way valving. Valve seats 171 and 173 are formed by two fixed seat assemblies 170 and 172. Both fixed valve seat assemblies 170, 172 are of the type employed in valve unit 10, which was described supra. The three-way valving of valve assembly 50 is operated by a single actuator 180 mounted to the end cap 154 fitted into valve unit 160. A threaded shaft 184 is connected to the reciprocal piston shaft 182 of actuator 180 by a shaft coupling 186. Shaft 184 extends through the valve interior along the longitudinal axis running the entire length of the valve assembly. The terminal end of shaft 184 reciprocally extends through an end cap 156 fitted into valve unit 164. Valve discs 176 and 178 are adjustably mounted to shaft 184 by two sets of hex nuts 188 or other suitable fasteners. The location of valve discs 176,178 along the length of shaft 184 can be finely adjusted by hex nuts 188, so that proper sealing against the valve seats can be achieved.

Again, the three-way valving of valve assembly 150 is accomplished by the actuator 180 linearly moving the two valve discs between sealed engagements against the two valve seals within the valve interior. As shown in FIG. 10, when actuator 180 is deactivated, shaft 184 moves valve disc 176 away form valve seat 171 and valve disc 178 against valve seal 173, thereby permitting air flow between ports 161 and 163. When actuator 180 is activated (not illustrated in the figures), shaft 184 moves valve disc 176 against valve seat 171 and valve disc 178 away from valve seat 173, thereby permitting air flow between ports 163 and 166.

Typical Valve Assembly Application

Figure 11:
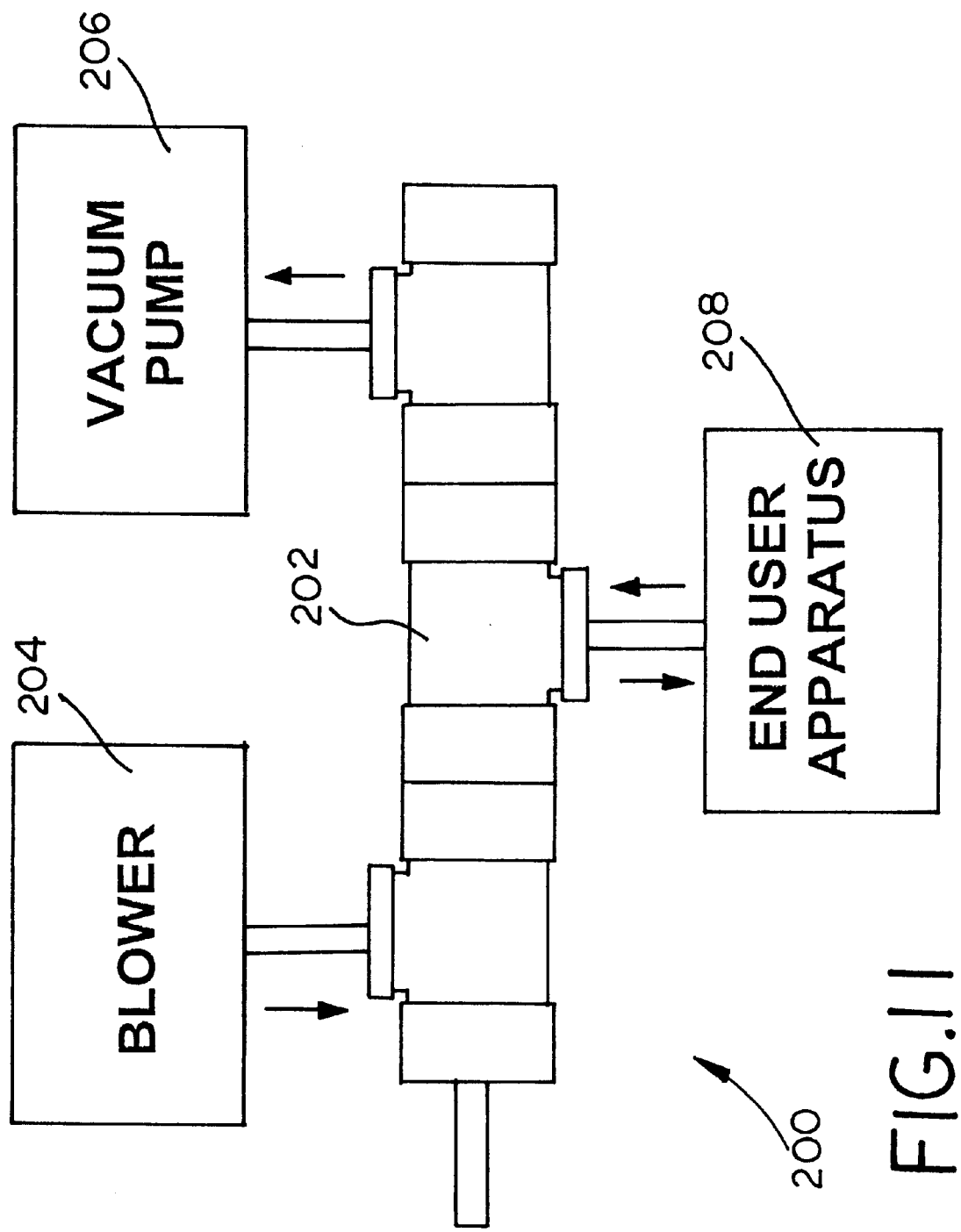
FIG. 11 is a schematic of a type pneumatic application using a three-way valve assembly to switch between positive and negative air flows.

FIG. 11 illustrates a three-way valve assembly 202 in a simplified pneumatic system 200, which requires both negative (vacuum) and positive airflow pressure. This illustration is intended to demonstrate an application of the valve assembly of this invention in a typical pneumatic system and is not intended to limit the scope of this invention. Valve assembly 202 is of the type described supra. As shown, the system 200 includes a blower 204, a vacuum pump 206, and an end user apparatus 208. The end user apparatus may include any equipment, instrument or device that selectively requires either a vacuum or positive air pressure. Blower 204 provides a positive low pressure air flow for the end user apparatus 208 and vacuum pump 206 provides a negative low pressure air flow from end user apparatus 208. Valve assembly 202 is selectively actuated between a first position, where blower 204 provides a positive pressure airflow to user apparatus 208 and a second position, where vacuum pump 206 draws a negative pressure (vacuum) air flow from end user apparatus 208. One skilled in the art will note that the actuation of the valve assembly between its first and second positions can be controlled manually by the operator of the end user apparatus or controlled as part of an automated control system.

Advantages

One skilled in the art will recognize that the modular valve assembly of this invention provides several practical advantages and improvements over conventional valves. Constructing the valve assembly from common plastic plumbing pipes and fittings provides cost savings, design flexibility and installation convenience. PVC and CPVC plumbing pipes and fittings are inexpensive and readily available. The modular nature of PVC plumbing fittings makes installing the valve system into existing pneumatic lines and fittings convenient and uncomplicated. Interconnecting the valve units with the various plumbing fittings requires minimal labor and technical skill. The PVC or CPVC construction makes the weight of the valve units and connection components much lighter in weight than similar conventional valves. Using plumbing fittings also allows the valve system to be scaled up and down as required in any particular system application.

The modular design of the valve assembly allows sophisticated custom designed valve systems to be assembled from simple individual valve modules or units, valving components and common plumbing pipes and fittings. The individual valve units, valving components and plumbing fittings can be combined and modified, as needed to suit the design criteria for any low pressure pneumatic application. The multi-port valve assembles can be used simultaneously with both positive or negative (vacuum) air pressures. The modular design also provides an advantage in servicing the valve assembly. Since the actuator is a separate modular component and not enclosed or integrated into the valve housing, it can be readily serviced and replaced without disassembling or replacing the entire valve unit or assembly. Likewise, valve seat assemblies and valve discs often can be replaced and serviced without disassembling or replacing the entire valve unit or assembly. Since the modular valve systems do not rely on intricate internal valving components for actuation, they can tolerate extreme environments and be used with air flows containing high particulate counts.

Individual valve units can be operated as either normally open or normally closed. In addition, individual valve units and assemblies can have any desired port configuration or orientation. The larger valve interior and 90 degree orientation of the ports provides a larger more direct flow passage than conventional valves, which makes the valve systems less susceptible to valve obstruction due to flow contamination or pressure drops. The modular design allows any valve assembly to be operated by a single common actuator. Multi-way valving can be controlled by the linear movement of the valve discs within the integrated valve interior. Unlike conventional valves, the position of the valve disc within the valve interior can be adjusted to ensure proper sealing against the valve seats and to accommodate seating variations caused by component wear and thermal expansion. In addition, the position of the valve seats within the valve interior can be adjusted to accommodate wear and thermal expansion. The design of this valve assembly also allows for radial and to a limited degree axial adjustment of the side ports. This feature allows the valve assembles to simplify the routing of the piping in any particular application. Another unique, but subtle feature, is that the valve assembly may use a "soft seat" valving design, wherein there is not metal to metal contact in seating the valve disc against the valve seat. The metal discs abut against a valve seat comprised of a rubber seal and PVC or CPVC pipe. The "soft seat" valving design allows the valve assembly to be used safely in volatile applications where spark and explosion are concerns.

It is understood that the above description does not limit the invention to the details given, but may be modified within the scope of the following claims.

What is claimed is:

1. A valve assembly comprising:
    a valve housing defining a cylindrical housing interior, the housing including a first tee part and a second tee part, each of the first tee part and the second tee part having a first open end, a second open end axially opposed to the first open end, and a side port located between the first open end and the second open end opening, the first tee part interconnected end to end to the second tee part to form part of the valve housing such that the second open end of the first tee part is coupled to the first open end of the second tee part,
    a valve seat disposed within the housing interior,
    a valve seat adjustment means interconnecting the valve seat and valve housing between the first tee part and the second tee part for selectively positioning the valve seat within the housing interior,
    a disc disposed within the housing interior and axially shiftable within the housing interior between a first position where the disc sealingly abuts against the valve seat thereby preventing flow communication between the side port and the second open end of the first tee part and a second position where the disc is spaced from the valve seat thereby permitting flow communication between the side port and the second open end of the first tee part, and
    actuation means sealingly fitted to the first end of the first tee part and operatively connected to the disc for selectively reciprocating the disc within the housing interior between its first position and its second position.

2. The valve assembly of claim 1 and a second valve seat disposed within the housing interior and spaced from the first valve seat,
    the disc disposed between the first and second valve seats and also for sealingly abutting against the second valve seat, such that in its first position the disc sealingly abuts the first valve seat and is spaced from the second valve seat, thereby permitting flow communication between the side port of the second tee part and the second open end of the second tee part, and in its second position, the disc is spaced from the first valve seat and sealingly abuts the second valve seat, thereby permitting flow communication between the side port of the first tee part and the side port of the second tee part.

3. The valve assembly of claim 1 and a second valve seat disposed within the housing interior and spaced from the first valve seat,
    a second disc disposed within the housing interior and axially shiftable within the housing interior between a first position where the second disc sealingly abuts against the second valve seat thereby preventing flow communication between the side port of the second tee part and the first open end of the second tee part,
    and a second position where the disc is spaced from the valve seat thereby permitting flow communication between the side port of the second tee part and the first open end of the second tee part,
    the actuation means also operatively connected to the second disc for selectively reciprocating the second disc within the housing interior between its first position and its second position, such that the second disc is in its second position when the first disc is in its first position and the second disc is in its first position when the first disc is in its second position.

4. The valve assembly of claim 1 wherein the actuation means includes an end cap sealing mounted to the first open end of the first tee part, a piston cylinder mounted to the end cap, and a reciprocating shaft part extending axially into the housing interior.

5. The valve assembly of claim 4 wherein the actuation means also includes disc adjustment means for mounting the disc to the shaft part at selective locations along the length of the shaft part.

6. The valve assembly of claim 1 wherein the valve seat adjustment means includes a collar part interconnected to the valve housing for shiftable movement within the second open end of the first tee part, the valve seat fitted into the collar part and extending into the housing interior.

7. The valve assembly of claim 6 wherein one of the second open end of the first tee part and the collar part includes a threaded female part and the other of the second open end of the first tee part and the collar part includes a threaded male part turned into the threaded female part.

8. The valve assembly of claim 7 wherein the seat adjustment means includes a lock ring turned onto the male threaded part for securing the collar part at a fixed location within the second open end of the first tee part.

9. The valve assembly of claim 7 wherein the collar part is a plumbing bushing.

10. The valve assembly of claim 6 wherein collar part is connected to the first open end of the second tee part.

11. The valve assembly of claim 1 and port adjustment means interconnecting the first tee part to the second tee part for adjusting the radial orientation of the side port of the second tee part with respect to the radial orientation of the side port of the first tee part.

12. The valve assembly of claim 11 wherein the port adjustment means includes one of the second open end of the first tee part and the first open end of the second tee part includes a threaded female part and the other of the second open end of the first tee part and the first open end of the second tee part includes a threaded male part turned into the threaded female part.

13. The valve assembly of claim 1 wherein the housing is constructed of plumbing fittings.

14. The valve assembly of claim 13 wherein the tee part is a plumbing tee joint.

15. The valve assembly of claim 1 wherein the valve seat is constructed of plumbing fittings.

16. A valve assembly comprising:

a valve housing defining a cylindrical housing interior, the housing including a first tee part and a second tee part, each of the first tee part and the second tee part having a first open end, a second open end axially opposed to the first open end, and a side port located between the first open end and the second open end opening, the first tee part interconnected end to end to the second tee part to form part of the valve housing such that the second open end of the first tee part is coupled to the first open end of the second tee part, port adjustment means interconnecting the first tee part to the second tee part for adjusting the radial orientation of the side port of the second tee part with respect to the radial orientation of the side port of the first tee part a valve seat disposed within the housing interior, a disc disposed within the housing interior and axially shiftable within the housing interior between a first position where the disc sealingly abuts against the valve seat thereby preventing flow communication between the side port and the second open end of the first tee part and a second position where the disc is spaced from the valve seat thereby permitting flow communication between the side port and the second open end of the first tee part, and actuation means sealingly fitted to the first end of the first tee part and operatively connected to the disc for selectively reciprocating the disc within the housing interior between its first position and its second position.

17. A valve assembly comprising:

a valve housing constructed of plumbing components and defines a cylindrical housing interior, the housing including a plurality of tee joints interconnected end to end with each other, each tee joint having a first open end, a second open end axially opposed to the first open end, and a side port located between the first open end and the second open end opening, a plurality of valve seats constructed of plumbing components disposed within the housing interior, valve seat adjustment means interconnecting at least one of the plurality of valve seats and valve housing between the first tee part and the second tee part for selectively positioning that valve seat within the housing interior, a plurality of discs disposed within the housing interior and shiftable axially within the housing interior for sealing engagement against at least one of the plurality of valve seats, and a piston cylinder mounted to the valve housing and operatively connected to the discs for moving the plurality of discs between a first position where at least one of the plurality of discs sealingly abuts against one of the plurality of valve seats thereby permitting flow communication between selected ones of the plurality of tee joints and second position where at least one of the plurality of discs sealingly abuts against another of the plurality of valve seats thereby permitting flow communication between other selected ones of the plurality of tee joints.

\* \* \* \* \*